(12) United States Patent
Ptasinski et al.

(10) Patent No.: US 9,140,914 B1
(45) Date of Patent: Sep. 22, 2015

(54) APPARATUS AND METHOD FOR STABILIZING THE TEMPERATURE OF A PHOTONIC CIRCUIT

(71) Applicants: Joanna N. Ptasinski, La Jolla, CA (US); Lin Pang, San Diego, CA (US); Iam Choon Khoo, State College, PA (US); Yeshaiahu Fainman, San Diego, CA (US); Sungwoon Kim, La Jolla, CA (US)

(72) Inventors: Joanna N. Ptasinski, La Jolla, CA (US); Lin Pang, San Diego, CA (US); Iam Choon Khoo, State College, PA (US); Yeshaiahu Fainman, San Diego, CA (US); Sungwoon Kim, La Jolla, CA (US)

(73) Assignee: The United States of America as represented by Secretary of the Navy, Washington, DC (US)

( * ) Notice: Subject to any disclaimer, the term of this patent is extended or adjusted under 35 U.S.C. 154(b) by 23 days.

(21) Appl. No.: 14/231,367

(22) Filed: Mar. 31, 2014

(51) Int. Cl.
*G02F 1/13* (2006.01)

(52) U.S. Cl.
CPC .................................... *G02F 1/132* (2013.01)

(58) Field of Classification Search
CPC ...................................................... G02F 1/132
USPC ......................................................... 349/199
See application file for complete search history.

(56) References Cited

U.S. PATENT DOCUMENTS

2007/0258677 A1* 11/2007 Chigrinov et al. .............. 385/15

OTHER PUBLICATIONS

Kishore Padmaraju, Johnnie Chan, Long Chen, Michal Lipson, and Keren Bergman, "Thermal stabilization of a microring modulator using feedback control," Opt. Express 20, 27999-28008 (2012).
Biswajeet Guha, Bernardo B. C. Kyotoku, and Michal Lipson, "CMOS-compatible athermal silicon microring resonators," Opt. Express 18, 3487-3493 (2010).
Vivek Raghunathan, Tomoyuki Izuhara, Jurgen Michel, and Lionel Kimerling, "Stability of polymer-dielectric bi-layers for athermal silicon photonics," Opt. Express 20, 16059-16066 (2012).
Peng Wang, Avram Bar-Cohen, Bao Yang, Gary L. Solbrekken, and Ali Shakouri; Analytical modeling of silicon thermoelectric microcooler; Journal of Applied Physics 100, 014501 (2006).
Joanna Ptasinski, Sung W. Kim, Lin Pang, Iam-Choon Khoo, and Yeshaiahu Fainman; Optical tuning of silicon photonic structures with nematic liquid crystal claddings; Optics Letters / vol. 38, No. 12 / Jun. 15, 2013.
Kishore Padmaraju, Dylan F. Logan, Xiaoliang Zhu, Jason J. Ackert, Andrew P. Knights, Keren Bergman; Integrated Thermal Stabilization of a Microring Modulator; OFC/NFOEC Technical Digest (2013).
Joanna Ptasinski, Iam-Choon Khoo, and Yeshaiahu Fainman; Passive Temperature Stabilization of Silicon Photonic Devices Using Liquid Crystals; Materials Mar. 14, 2014.

* cited by examiner

*Primary Examiner* — Paul Lee
(74) *Attorney, Agent, or Firm* — SPAWAR Systems Center Pacific; Kyle Eppele; J. Eric Anderson

(57) ABSTRACT

A temperature-stabilized photonic circuit comprising: a material platform; a complementary metal-oxide-semiconductor (CMOS)-compatible, photonic device integrated on the material platform, wherein the photonic device has a positive thermo-optic coefficient; and a liquid crystal layer clad over the photonic device, wherein the liquid crystal layer has a negative thermo-optic coefficient such that the temperature of the circuit is passively stabilized through adjustment of the effective refractive index of the photonic device.

20 Claims, 18 Drawing Sheets

APPARATUS AND METHOD FOR STABILIZING THE TEMPERATURE OF A PHOTONIC CIRCUIT

FEDERALLY-SPONSORED RESEARCH AND DEVELOPMENT

The United States Government has ownership rights in this invention. Licensing and technical inquiries may be directed to the Office of Research and Technical Applications, Space and Naval Warfare Systems Center, Pacific, Code 72120, San Diego, Calif., 92152; voice (619) 553-5118; ssc_pac_t2@navy.mil. Reference Navy Case Number 102778.

BACKGROUND OF THE INVENTION

Network technical requirements and operational needs continue to evolve towards a direction in which information and services can be transmitted rapidly and at low cost to anyone, anywhere, at any time. Growing bandwidth needs have presented the need for optical communication at scales and distances smaller than previously envisioned. The silicon photonics platform, with its ability to manifest CMOS-compatible photonic devices, is promising for use in next-generation optical links. However, as optics penetrates deeper into the chip temperature stability becomes more important due to silicon's high thermo-optic coefficient ($1.86 \times 10^{-4}$/° C.) accompanied by an appreciable modification of the refractive index in the presence of rising temperature and resulting in performance deterioration of photonic devices and systems. Correspondingly, at power densities of 100 W/cm$_2$ in modern microelectronic Very Large Scale Integration (VLSI) chips, the problem of heat dissipation is a major challenge even with the most advanced packaging technologies. Local temperature stabilization becomes impossible with thousands of devices with varying temperature profiles across a single chip.

SUMMARY

Disclosed herein is a temperature-stabilized photonic circuit comprising a material platform, a complementary metal-oxide-semiconductor (CMOS)-compatible, photonic device integrated on the material platform, and a liquid crystal layer. The photonic device has a positive thermo-optic coefficient. The liquid crystal layer is clad over the photonic device. The liquid crystal layer has a negative thermo-optic coefficient such that the temperature of the circuit is passively stabilized through adjustment of the effective refractive index of the photonic device.

The invention disclosed and claimed herein may also be described as a method for stabilizing the temperature of a circuit comprising multiple steps. The first step provides for providing a CMOS-compatible, photonic device integrated on a material platform. The device has a positive thermo-optic coefficient. The next step provides for cladding the device with a liquid crystal layer that has a negative thermo-optic coefficient such that the temperature of the device is passively stabilized by adjusting the effective refractive index of the photonic device.

An embodiment of the invention disclosed and claimed herein may be described as a temperature-stabilized photonic circuit comprising: a silicon platform, a photonic device, a liquid crystal layer, a temperature sensor, and a liquid crystal tuner. The photonic device is CMOS-compatible, is integrated on the silicon platform, and has a positive thermo-optic coefficient. The tunable liquid crystal layer is clad over the photonic device. The temperature sensor is configured to monitor the temperature of the device. The liquid crystal tuner is operatively coupled to the liquid crystal layer, and is configured to tune the refractive index of the liquid crystal layer thereby tuning the effective refractive index of the photonic device such that the temperature of the device is actively stabilized.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

Figure 1:
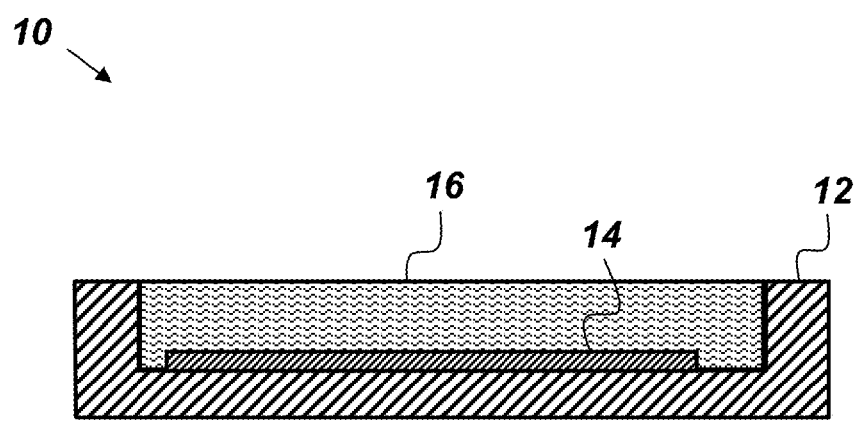
FIG. 1 is a cross-sectional, side-view illustration of an embodiment of a photonic circuit.

FIG. 1 is a cross-sectional, side view of an embodiment of a temperature-stabilized photonic circuit 10. The photonic circuit 10 comprises, consists of, or consists essentially of a material platform 12, a complementary metal-oxide-semiconductor (CMOS)-compatible, photonic device 14, and a liquid crystal (LC) layer 16. The CMOS-compatible, photonic device 14, which has a positive thermo-optic coefficient (TOC), is integrated on the material platform 12. The LC layer 16, which may have a negative TOC, is clad over the photonic device 14 such that the temperature of the circuit 10 is passively stabilized through adjustment of the effective refractive index of the photonic device 14—thereby reducing the need for power-hungry, large-footprint temperature stabilization techniques based on Joule heating. The photonic circuit 10 is CMOS-compatible and may be constructed without polymer cladding or thermo-electric coolers. A circuit is CMOS-compatible if existing structures/devices of the circuit are not negatively affected by CMOS processes.

The material platform 12 may be made of any material that is CMOS-compatible and capable of supporting a chip-scale photonic device. The majority of the embodiments of circuit 10 described herein are silicon based. However, it is to be understood that the circuit 10 is not limited to silicon, as any other high positive TOC photonic material can be used for the photonic device 14 and/or the material platform 12. The material platform 12 may or may not have a positive TOC.

The photonic device 14 may be any integrated photonic device having a positive TOC. Suitable examples of the photonic device 14 include, but are not limited to, waveguiding, filtering and modulating structures, as well as couplers. The photonic device 14 may be configured to operate without the LC layer 16. In other words, the LC layer 16 may be added to an existing photonic device 14 where the LC layer 16 is not necessary for the original, intended function of the existing photonic device 14. In this embodiment, apart from temperature stabilization, the LC layer 16 is designed to not otherwise affect the operation of the photonic device 14.

The LC layer 16 may be any liquid crystal layer that is tunable. A suitable example of the LC layer 16 includes, but is not limited to, 4-Cyano-4'-pentylbiphenyl (referred to herein as 5CB), which is a nematic LC with the chemical formula $C_{18}H_{19}N$. The LC layer 16 may be actively tuned via a control voltage (DC or low frequency AC field), a magnetic field, and/or optical means. The LC layer 16 may be undoped or, optionally, may be doped with Azo dyes.

The photonic circuit 10 does not require the active use of external heaters or thermoelectric coolers resulting in a smaller size, power, and cost footprint. The photonic circuit 10 also does not require the passive use of polymers. One of the embodiments of the photonic circuit 10 utilizes a passive thermal stabilization scheme for resonant photonic devices using the LC cladding layer 16. Liquid crystals' relatively low viscosity makes it possible to backfill them into chambers made in the material platform 12 during the fabrication process in a manner similar to microfluidic devices. For example, a liquid crystal mixture consisting of several cyanobiphenyls with aliphatic tails used commercially in liquid crystal displays (referred to herein as E7) has a viscosity of 40 cps at 20° C. LC claddings have relatively large negative TOCs and low absorption at the infrared and visible wavelengths, which translates into lower insertion losses. The TOC $d_n/dT$ in nematic LCs ranks among the largest of all known materials. The rod-like nematic LCs exhibit optical birefringence: ordinary refractive index no for light polarized perpendicular to the liquid crystal and extraordinary refractive index $n_e$ for light polarized parallel to the liquid crystal. LC crystalline properties become apparent when the LC is contained in thin flat cells. The alignment of the LC axis in such cells is essentially controlled by the cell walls whose surfaces may be treated in a variety of ways to achieve various director axis alignments. Homeotropic alignment (where the LC long axis is perpendicular to the surface) may be achieved by treating the cell walls with a surfactant such as hexadecyl-trimethyl-ammoniumbromide (HTAB) and planar alignment may be achieved by rubbing unidirectionally with a lens tissue; LCs then align their long axis along the rubbed direction. LC claddings may be added to a photonic circuit after back-end CMOS processes are complete. LC claddings help overcome roughness and stress-induced scattering loss and polarization dependence.

Figure 2A:
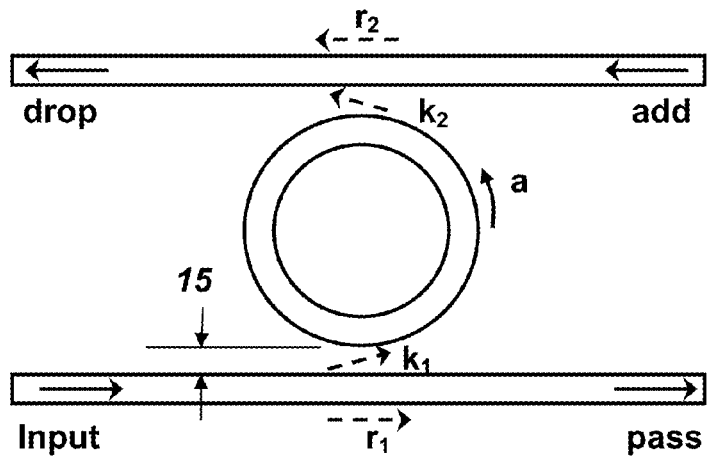
FIG. 2A is a top-view depiction of a ring resonator.

FIG. 2A is a depiction of a ring resonator wherein the radius of the ring is 9.9 μm, the width of the bus waveguide is 500 nm, and the gap 15 between the ring and the bus waveguide is 100 nm. The thermo-optic properties of LCs may be illustrated by LC cladding's effect on ring resonators. Ring resonators are examples of a photonic device 14 and they are highly sensitive to changes in the refractive index. A ring resonator consists of a closed loop waveguide commonly in the shape of a ring or a racetrack. Coupling to and from the device is achieved by placing bus waveguides within a close proximity of the ring, allowing for evanescent modes to overlap and allow coupling. The ring behaves as an interferometer and shows a resonance for light whose phase change after each full trip around the ring is an integer multiple of $2\pi$, where the difference between the vacuum wavelengths corresponding to two resonant conditions is referred to as the free spectral range (FSR). A resonant wavelength change is observed in response to an effective index change for the resonant mode and the amount of the resonant wavelength shift is influenced by the length of the ring perimeter, where the resonant wavelength is described by:

$$\lambda_{res} = \frac{L * n_{eff}}{m} \qquad \text{Equation (1)}$$

where L is the ring perimeter, $n_{eff}$ is the effective index of the mode, and m is an integer. The full width half maximum (FWHM) parameter may be described by:

$$FWHM = \frac{(1 - r_1 r_2 \alpha)\lambda_{res}^2}{\pi n_g L \sqrt{r_1 r_2 \alpha}} \qquad \text{Equation (2)}$$

where $r_1$ and $r_2$ are self-coupling coefficients, $n_g$ is a group index, L is a round trip length around the ring, and a is a single pass amplitude transmission.

Figure 2B:
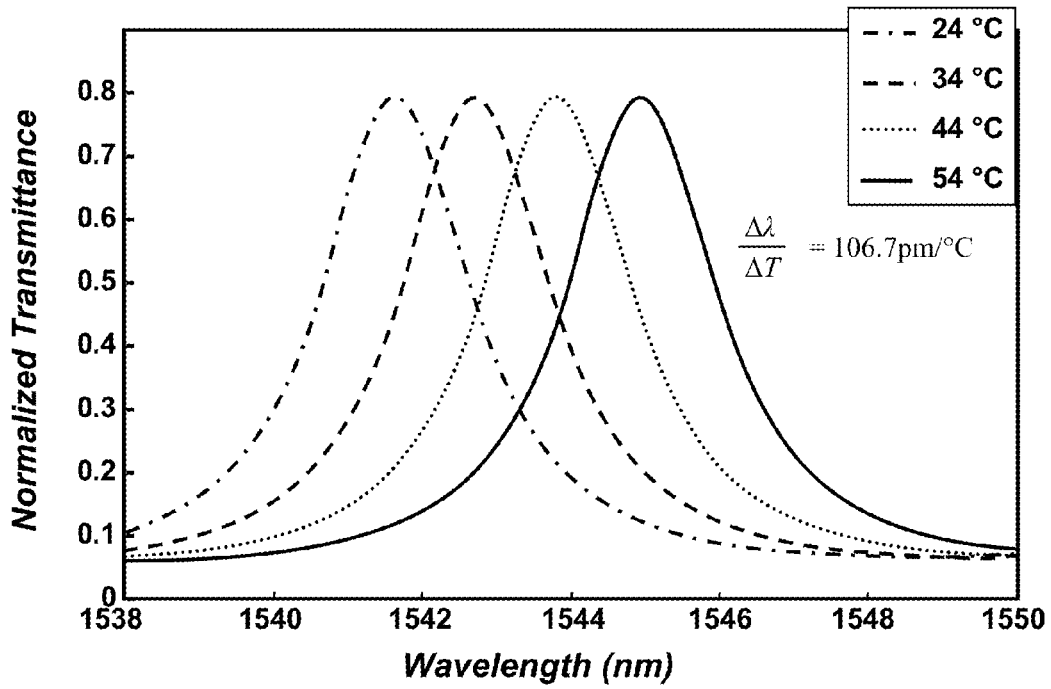
FIG. 2B is a finite-element simulation plot.
Figure 3A:
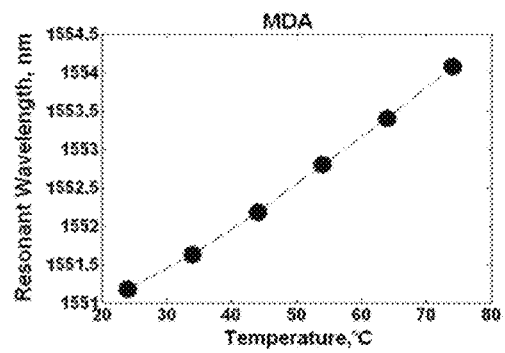
FIGS. 3A-3D are plots of resonant wavelength change as a function of increasing temperature for four different ring resonator devices.
Figure 3B:
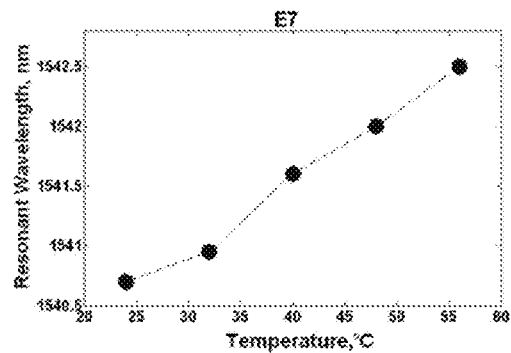
Figure 3C:
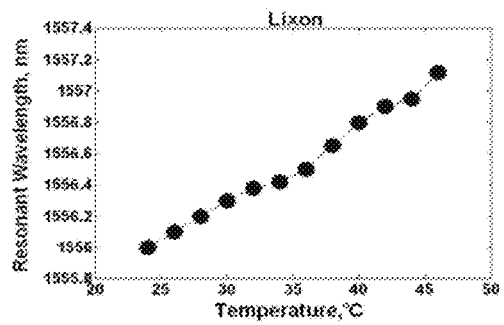
Figure 3D:
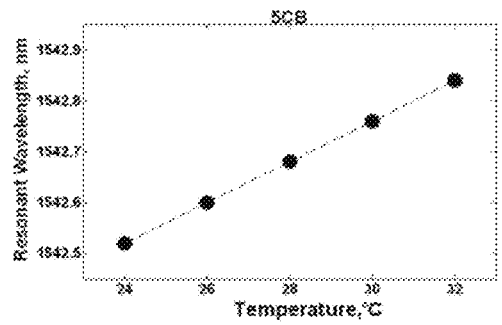

FIG. 2B depicts a 2-dimensional, finite-element simulation generated by COMSOL Multiphysics® software. FIG. 2B shows the projected fundamental Transverse Electric (TE)-mode resonance shift due to rising temperature for a silicon ring clad in $SiO_2$. Silicon photonic waveguides may consist of a silicon core and silica claddings; the large refractive index contrast between the core and cladding allows for total internal reflection with a very large incident angle. Typically, the TE-mode is more frequently used than the Transverse Magnetic (TM)-mode due to its low bending loss, stronger confinement in the waveguide core, and minimal leakage into the silicon substrate beneath a buried oxide (BOX) layer. In the simulation used to generate FIG. 2B, the ring was 500 nm wide, 250 nm tall, and with a perimeter of 62.2 μm. The effective index method was used in defining the effective mode indices and propagation constants of the ring resonator. The high, positive TOC of silicon ($\Delta n_{Si}/\Delta T=1.86\times10_{-4}/K$) together with the TOC of $SiO_2$ ($\Delta n_{SiO2}/\Delta T=1\times10_{-5}/K$) resulted in a 3.2 nm resonance shift for a 30° C. change in temperature, from 1541.7 nm to 1544.9 nm, which translates to $\Delta\lambda/\Delta T=106.7$ pm/° C. In modern dense wavelength division multiplexing (DWDM) systems with channel spacing of <1 nm, a difference of $\Delta\lambda/\Delta T=106.7$ pm/° C. can greatly influence channel location and crosstalk.

Table 1 below lists some characteristics of several different types of LC mixtures that may be used for the LC layer 16. Table 1 describes the following LC mixtures: 5CB (Sigma Aldrich, St. Louis, Mo., USA), E7 (Merck, Hunterdon County, N.J., USA), Lixon ZSM-5970 (Chisso Corp., Minamata, Japan), and MDA-05-2968 (Merck).

TABLE 1

Room temperature properties of liquid crystals used in the experiment.

| Liquid Crystal Mixture | Clearing Point | Optical Anisotropy | | | |
|---|---|---|---|---|---|
| | | $\Delta n$ | $n_e$ | $n_o$ | $<n>$ |
| 5CB (@22° C., 589 nm) | 35° C. | 0.191 | 1.725 | 1.534 | 1.598 |
| E7 (@20° C., 589 nm) | 58° C. | 0.226 | 1.747 | 1.521 | 1.597 |
| Lixon (@25° C., 589 nm) | 123° C. | 0.109 | 1.596 | 1.487 | 1.523 |
| MDA-05-2968 (@20° C., 589 nm) | 109.5° C. | 0.2685 | 1.781 | 1.5125 | 1.602 |

FIGS. 3A-3D are plots of the resonant wavelength change as a function of increasing temperature for four different ring resonator devices such as is shown in FIG. 2A, each being clad with a different LC layer 16 from Table 1. A measurement was performed on a ring resonator clad in air, which resulted in an 87.5 pm/° C. resonance shift and it served as the baseline. It should be noted that these embodiments of the photonic circuit 10 did not rely on an alignment layer in order to achieve a specific LC layer 16 orientation and the LCs were assumed to be randomly oriented exhibiting an average refractive index $<n>$. The experimental results are shown in Table 2 and FIGS. 3A-3D, where Table 2 provides a summary of the observed resonance shift per degree Celsius, while FIGS. 3A-3D track the resonant wavelength change as a function of increasing temperature. MDA-05-2968 LC produced a peak wavelength shift of 58 pm/° C., while the best response was attained with 5CB (40 pm/° C.) and it is further detailed in FIG. 4, where the measured resonance is shown at each temperature increment. Samples clad in E7 and Lixon presented a thermal drift of 56.3 pm/° C. and 52.3 pm/° C., respectively.

TABLE 2

Summary of results appearing in FIGS. 3A-3D.

| Liquid Crystal Cladding | Resonance shift/° C. | Measured Temperature Range |
|---|---|---|
| 5CB | 40 pm | 24-32° C. |
| E7 | 56.3 pm | 24-56° C. |
| MDA-05-2968 | 58 pm | 24-74° C. |
| Lixon | 52.3 pm | 24-46° C. |

Figure 4:
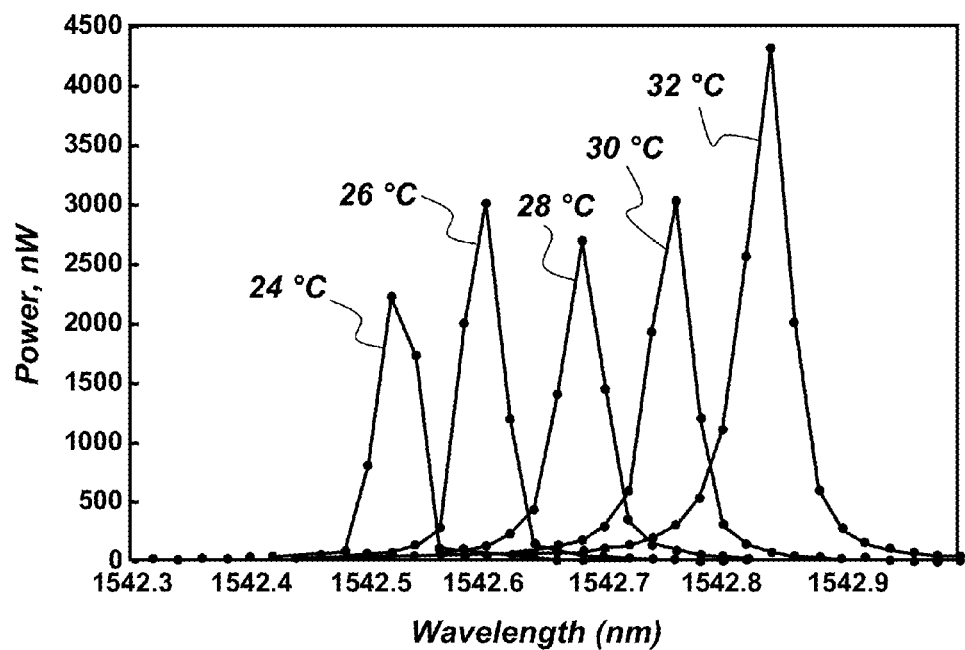
FIG. 4 is a plot of the measured resonance at several temperature increments.

FIG. 4 is a plot of the measured resonance at several temperature increments and shows the peak wavelength shift for a 5CB-clad ring resonator embodiment of the photonic device 14. The thermal drift is 40 pm/° C. It can be seen in FIGS. 3A-3D that the resonant wavelength shift of LC clad ring resonators is linear. This is to be expected, as the average LC index decreases linearly as temperature rises in both the anisotropic and isotropic phase. The measured resonance shifts were used in calculating the thermo-optic coefficients of the liquid crystal mixtures at 1550 nm. First, the measured air-clad ring resonator response served to validate the COMSOL Multiphysics® model. The measured resonance shift of an air clad resonator was 87.5 pm/° C., which strongly agrees with the COMSOL Multiphysics® simulation resonance shift of 87.5 pm/° C.

Figure 5A:
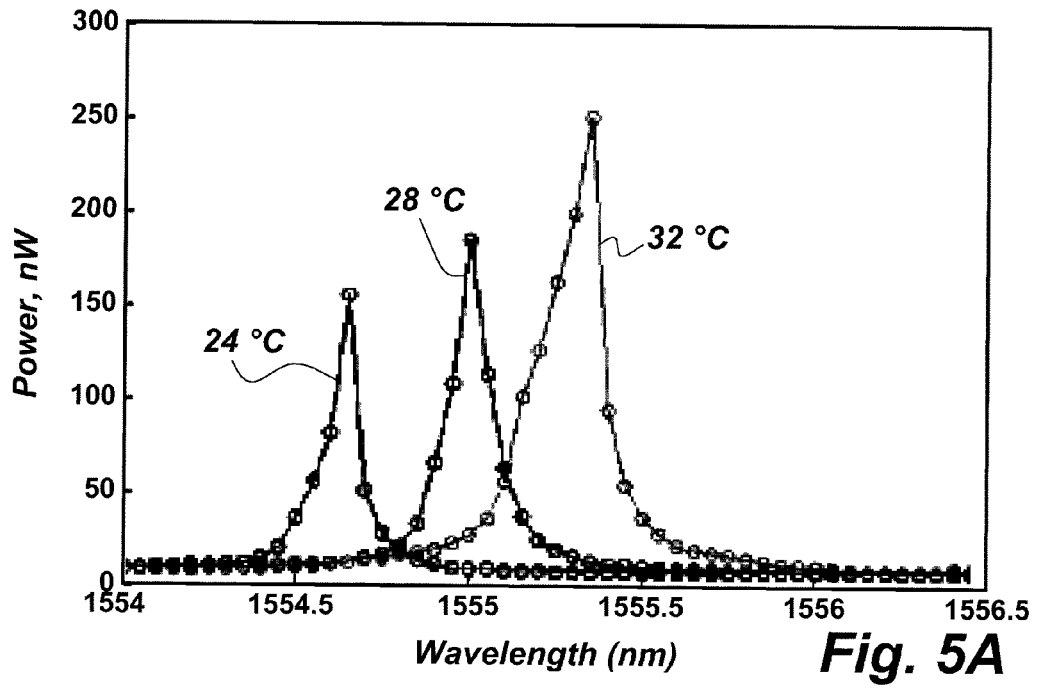
FIGS. 5A and 5B are respectively plots of (A) measured resonance shift in air of a ring resonator and (B) simulated shift of a ring resonator clad in air as a function of rising temperature.
Figure 5B:
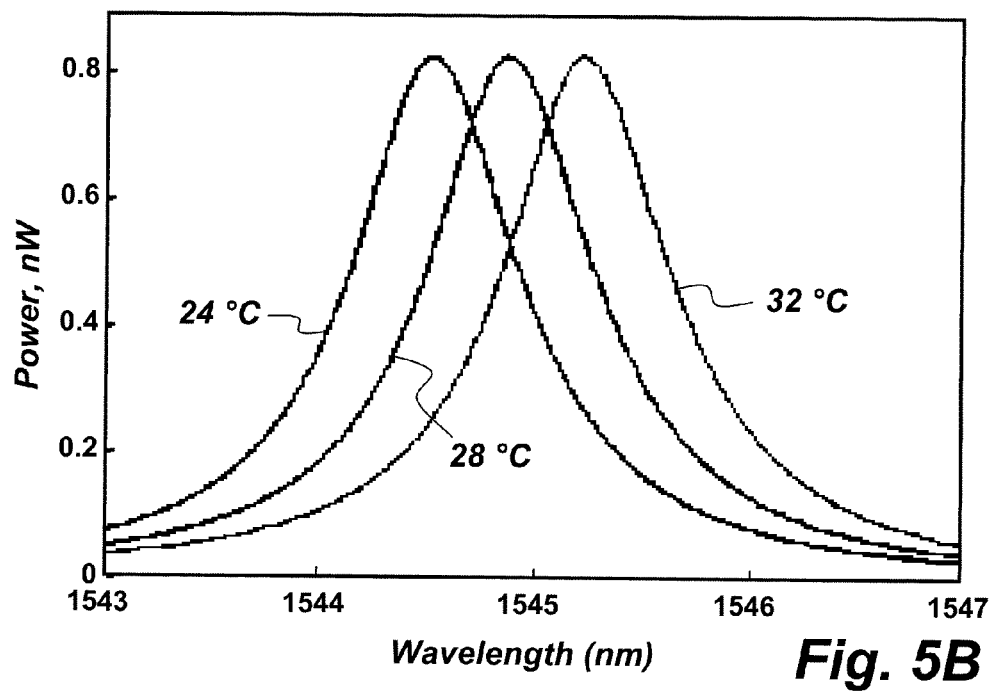

FIGS. 5A and 5B are respectively plots of (A) measured resonance shift in air of a ring resonator and (B) simulated shift of a ring resonator clad in air as a function of rising temperature. Experimentally observed LC cladding resonance shifts were used to obtain the change in the silicon waveguide mode effective indices using Equation (1). The effective mode indices then served to calculate the thermo-optic coefficient of the LC mixtures using the COMSOL Multiphysics® model. Table 3 below contains a summary of the results showing the change in the effective index as a function of a 30° C. increase in temperature and the corresponding thermo-optic coefficient of the various LC mixtures at 1550 nm. The LC mixture 5CB provides a negative average refractive index $<n>$ TOC of $\Delta n_{5CB}/\Delta T=-8.7\times10_{-4}$/° C. at 1550 nm. Lixon possesses a TOC of $\Delta n_{Lixon}/\Delta T=-7.2\times10_{-4}$/° C.; followed by E7 $\Delta n_{E7}/\Delta T=-6.7\times10_{-4}$/° C., and MDA $\Delta n_{MDA}/\Delta T=-6.5\times10_{-4}$/° C. It is not until the isotropic state that the LC $\Delta n/\Delta T$ fully equalizes.

TABLE 3

| Liquid Crystal Cladding | Effective Index Shift for a 30° C. Rise in Temperature | LC $\Delta n/\Delta T$ |
|---|---|---|
| 5CB | $\Delta n_{eff}=-0.0021$ | $-0.00087$/° C. |
| E7 | $\Delta n_{eff}=-0.0029$ | $-0.00067$/° C. |
| Lixon | $\Delta n_{eff}=-0.0027$ | $-0.00072$/° C. |
| MDA-05-2968 | $\Delta n_{eff}=-0.0030$ | $-0.00065$/° C. |

While LCs aid in minimizing temperature associated effects, complete athermal response is unlikely to be achieved without modifying the device geometry in the case when the system relies on passive temperature stabilization using LCs. The amount of passive thermal stabilization is directly related to the extent of the optical mode overlap with LCs, or any other negative TOC material. For instance, the mode of narrower waveguides will sense more of the LC cladding due to a larger portion of it being present outside of the silicon core region. An example of this appears in FIG. 6.

Figure 6:
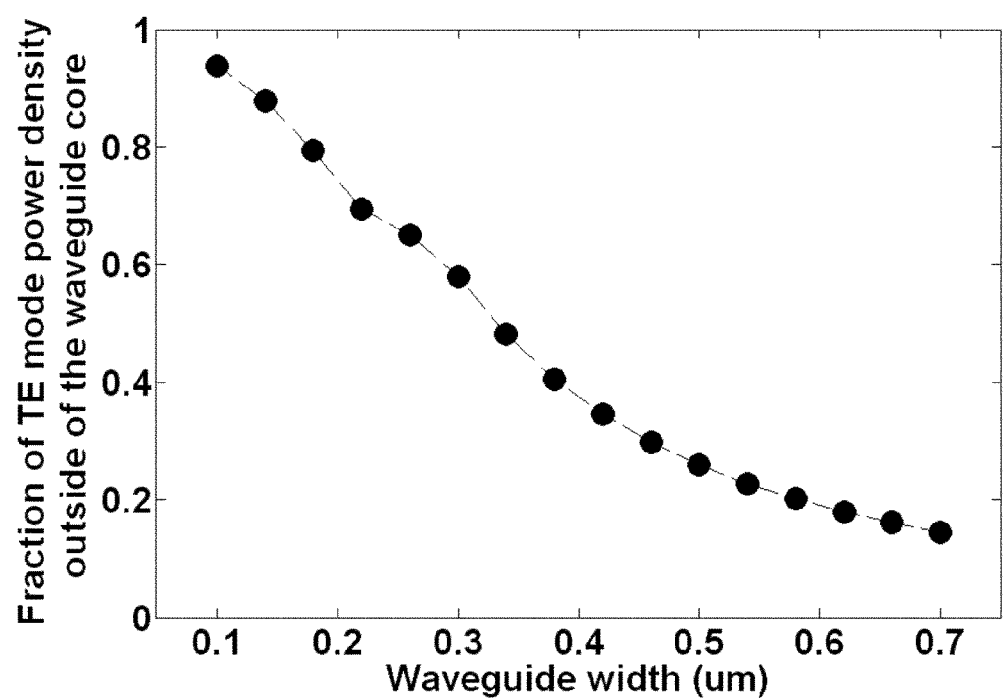
FIG. 6 is a plot depicting the amount of TE-mode power density that extends outside of a waveguide core as a function of waveguide width.

FIG. 6 is a plot depicting the amount of TE-mode power density that extends outside of the waveguide core into the cladding region as a function of waveguide width for a silicon rectangular waveguide core. The waveguide height was kept constant at 250 nm. The cladding region refractive index was n=1.53. For a 500 nm wide, 250 nm tall silicon waveguide surrounded by n=1.53 index cladding, a 26% mode overlap with the cladding region may be achieved. A 300 nm wide waveguide will result in a 58% cladding overlap. It should be noted that, besides device geometry, the exact cladding material's refractive index and surface roughness also come into play in mode confinement and propagation loss. Thus, while a narrower waveguide allows for increased interaction with the liquid crystal cladding, it also results in enhanced losses arising from a larger portion of the optical mode interacting with the sidewall surface roughness of the silicon core. These interface imperfections originate during the fabrication process from line edge corrugations of the electron beam resist, pattern transfer, or from the etching process itself. The roughness of core-cladding interfaces may result in transmission loss that scales with the square of the roughness amplitude, which is a reason to choose waveguides of 500 nm width as compared to narrower ones. The LC mixture 5CB, which possesses the lowest clearing point temperature ($T_{ni}$=35° C.), has the largest negative TOC. The LC mixture 5CB is applicable to achieving predictable operation of silicon-based wavelength-division multiplexing (WDM) devices located on typical high performance multicore chips which may endure ±10° C. temperature variations. Due to 5CB's flash point of 113° C., Lixon with its clearing point temperature of $T_{ni}$=123° C., may be better suited for applications in which the microprocessor die hot spot thermal range fluctuates between 70-120° C.

Figure 7:
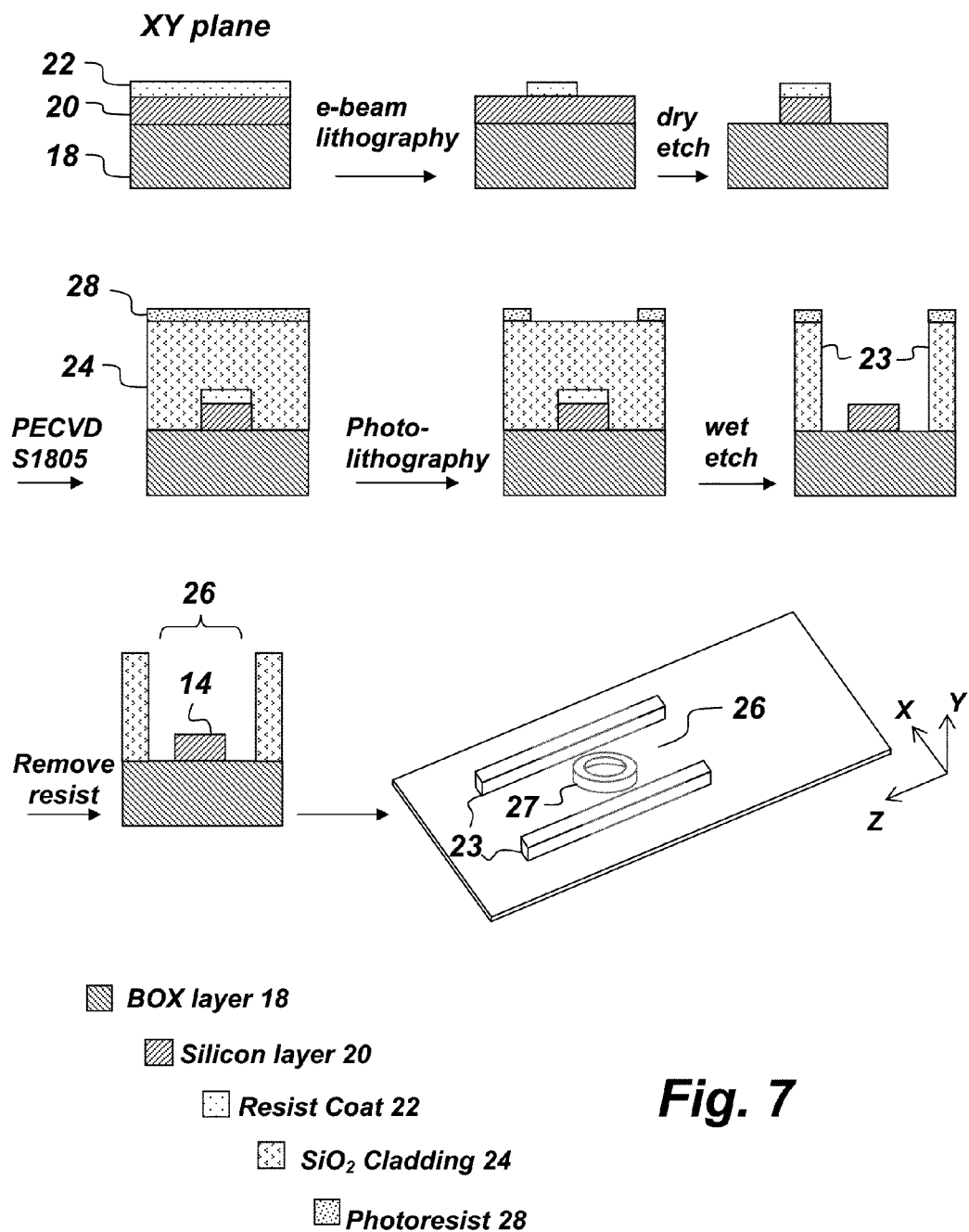
FIG. 7 is an illustration of an example fabrication process for an embodiment of a photonic circuit.

FIG. 7 is an illustration of an example fabrication process for an embodiment of the photonic circuit 10 where the photonic device 14 is a ring resonator. This embodiment of the photonic circuit 10 may be fabricated using a 680 μm thick silicon on insulator (SOI) wafer composed of a silicon handle 17 (shown in FIG. 5), a 3 μm $SiO_2$ layer 18 (often referred to as the "buried oxide" or "BOX" layer), and a 250 nm silicon layer 20 placed on top of the BOX layer. The 3 μm $SiO_2$ layer 18 aids in preventing the evanescent field of the optical mode from penetrating the silicon substrate below. Dow Corning® FOX-16 electron beam (e-beam) resist may be diluted in Methyl isobutyl ketone (MIBK), one part FOX-16 to two parts MIBK (by weight), and spun at 4000 rpm resulting in a 180 nm thick resist coat 22. This embodiment of the photonic circuit 10 may be patterned with a Vistec® EBPG 5200 e-beam system using a dosage of 5120 μC/$cm_2$ and may be developed in Tetramethylammonium hydroxide (TMAH) for 1 min. Dry etch of silicon may be performed using Oxford® Plasmalab 100 RIE/ICP with a mixture of 25 sccm of $SF_6$ and 50 sccm of $C_4F_8$ at a temperature of 15° C., and with a reactive-ion etching (RIE) power of 30 W and inductively coupled plasma (ICP) power of 1200 W. The resulting silicon bus waveguides 23 and ring 27 may be covered by a 1800 nm layer of $SiO_2$ cladding 24 deposited via Oxford® Plasmalab 80 Plus plasma-enhanced chemical vapor deposition (PECVD) at 350° C. using a mixture of 5% $SiH_4$ and 95% $N_2$ at 117 sccm with 710 sccm of $N_2O$ at a deposition rate of 72 nm/min. The PECVD chamber pressure may be 1000 mT and the RF power may be 20 W at 13.56 MHz. A window area 26 may be positioned over the photonic device 14 and may be patterned with Shipley® S1805® photoresist 28, exposed in a Hybrid Technology Group (HTG) Mask Aligner and etched in a CMOS grade buffered oxide solution (BOE) consisting of 33.5% $NH_4$, 7% HF, and 59.5% $H_2O$, for a duration of 195 s. The remaining S1805 photoresist 28 may be removed with Shipley® Microposit® Remover 1165.

Figure 8A:
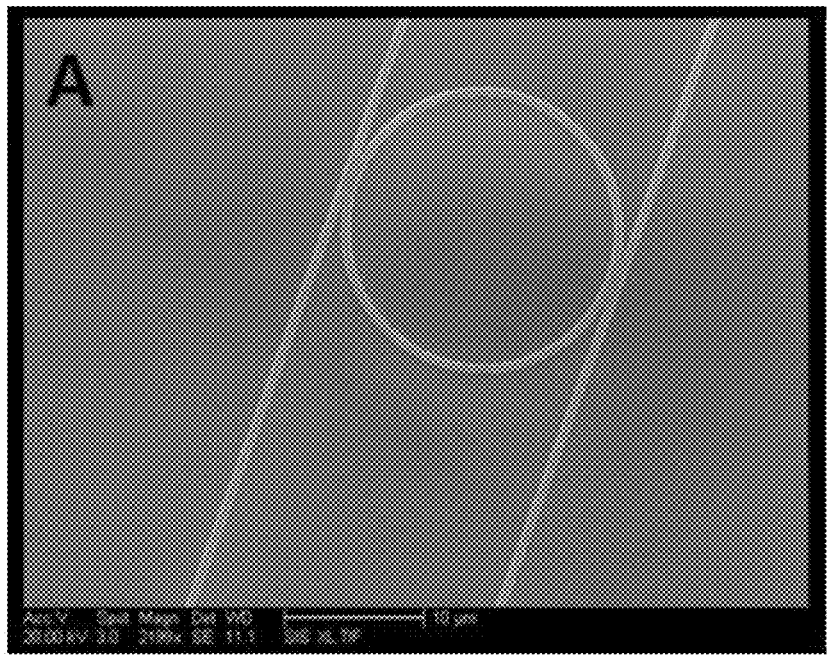
FIGS. 8A and 8B are scanning electron microscope images of a ring resonator embodiment of a photonic circuit.
Figure 8B:
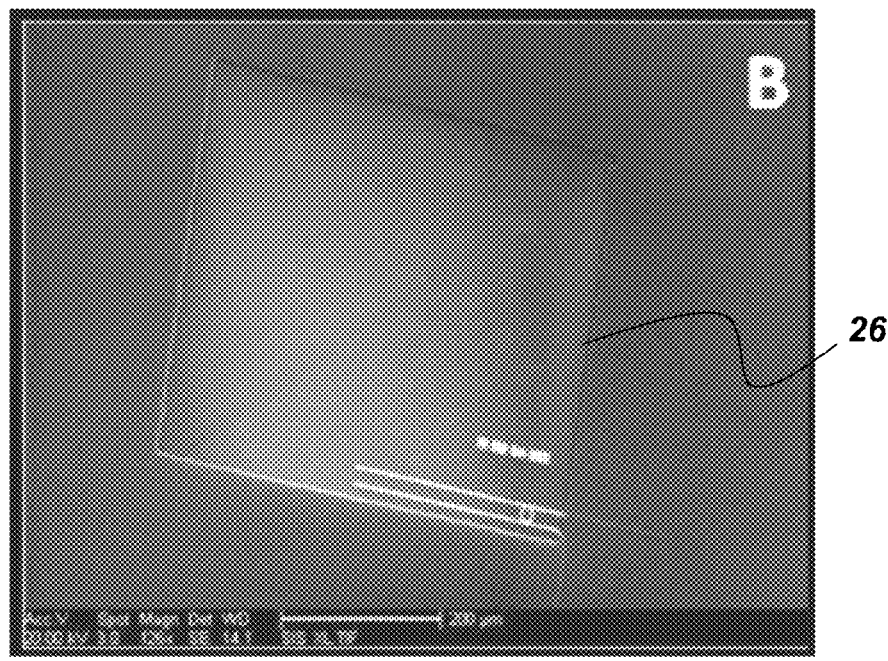

FIGS. 8A and 8B are scanning electron microscope (SEM) images of a ring resonator embodiment of the photonic circuit 10, such as is illustrated in FIG. 7. FIG. 8A depicts a close-up of a silicon ring resonator of 9.9 μm radius and 500 nm width. FIG. 8B shows the ring resonator photonic device clad in $SiO_2$ and with a window 26 etched over the ring to accommodate the LC layer 16. Placement of the LC layer 16 may be carried out in a clean room environment and preceded by a sample cleaning step using oxygen plasma. The oxygen plasma step aids in the removal of organic contaminants and it promotes adhesion and bonding to other surfaces.

Figure 9:
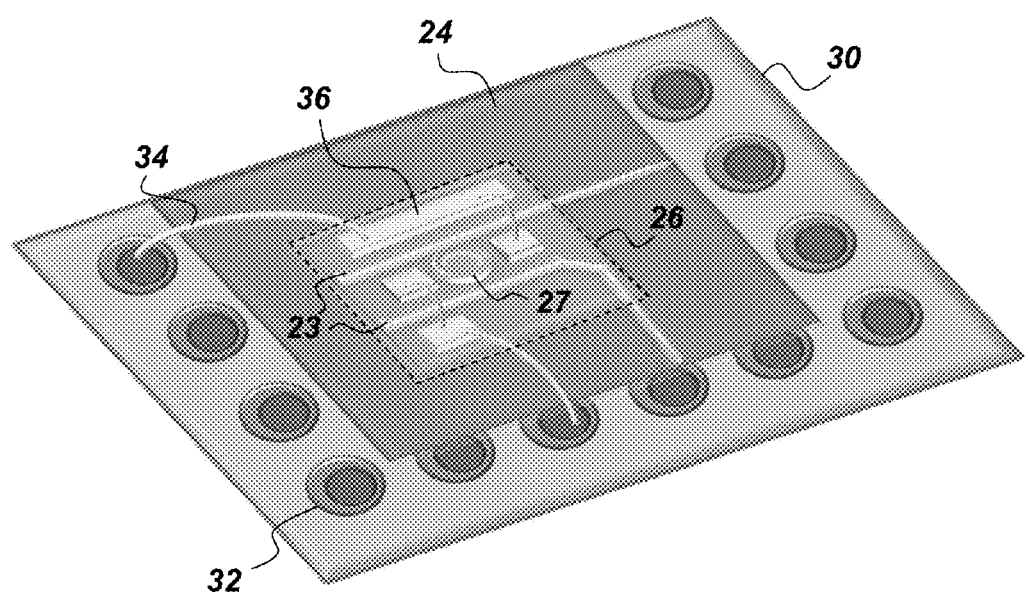
FIG. 9 is a perspective view of an embodiment of a photonic circuit.

FIG. 9 is a perspective view of an embodiment of the photonic circuit 10. In this embodiment, the photonic device 14 is a ring resonator comprising the ring 27 and bus waveguides 23. The photonic circuit 10 is mounted on a printed circuit board (PCB) 30 having copper contact pads 32. Bonded wires 34 may be used to connect an electrode 36 to any given contact pad 32. Also shown in FIG. 9, is the window area 26 in the $SiO_2$ cladding 24. The window area 26 may be filled with the LC layer 16.

Figure 10A:
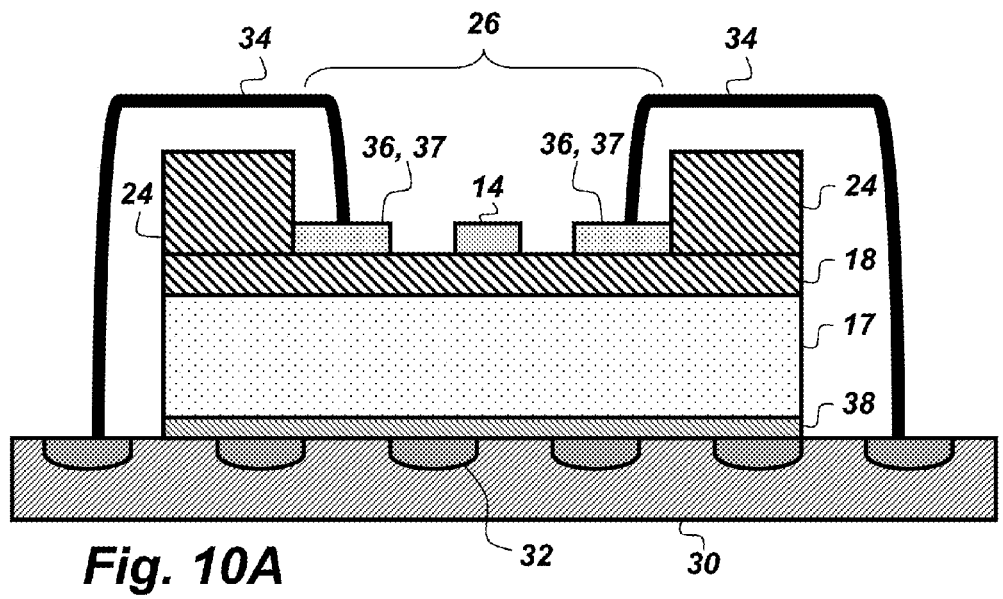
FIGS. 10A and 10B are cross-sectional, side views of embodiments of a photonic circuit.
Figure 10B:
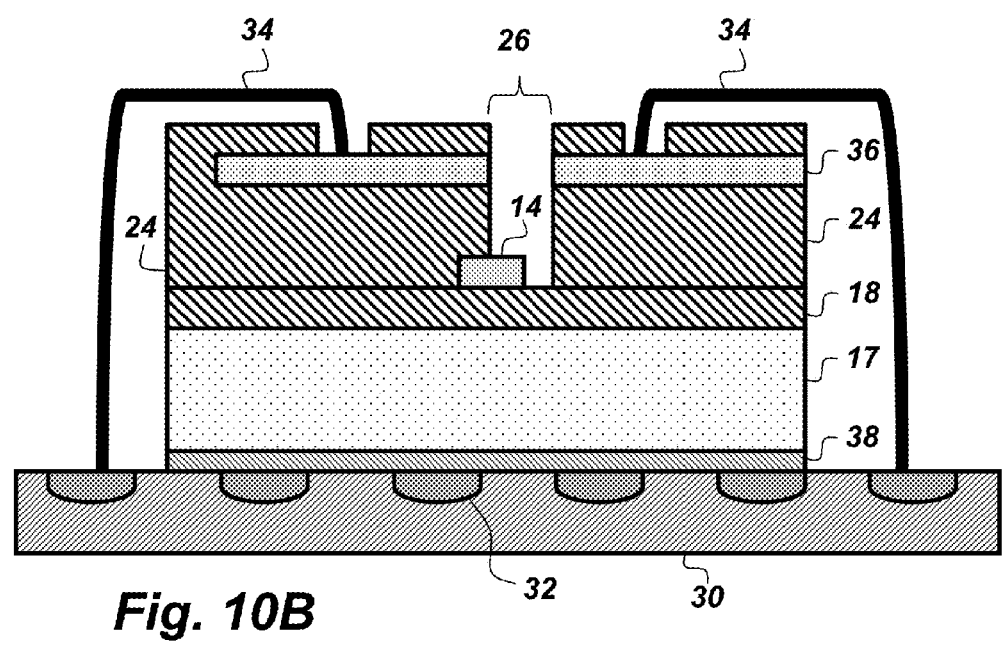

FIGS. 10A and 10B are cross-sectional, side views of embodiments of the photonic circuit 10. In the embodiment shown in FIG. 10A, metal electrodes 36, which form part of an LC tuner 37, are placed in the same plane as the photonic device 14 and an isolation layer 38 is disposed between the silicon handle 17 and the PCB 30. The LC tuner 37 is capable of tuning the refractive index of the LC layer 16 in the window area 26 by creating an electric field in the LC layer 16 which reorients the molecules of the LC. In the embodiment of the photonic circuit 10 shown in FIG. 10B, the metal electrodes 36 are placed above the photonic device 14. The placement of electrodes within a silicon dioxide cladding above a ring resonator circuit allows for breaking of the ring resonator symmetry. The height at which the electrodes are placed is chosen based on the loss experienced by the optical mode.

Table 4 lists the losses and the effective indices in both TE and TM modes for a ring resonator waveguide clad in $SiO_2$ at various separation distances from a gold electrode. The gold electrode used to generate the data in Table 4 was 250 nm in height, and the waveguide was 500 nm wide and 250 nm in height. The entire path length for the ring resonator waveguide (including the ring) was 0.65 mm.

TABLE 4

| Distance Separating Electrode from Waveguide | Effective Indices $n_{eff}$ | | % of Power Lost/mm | |
|---|---|---|---|---|
| | TE Mode | TM Mode | TE Mode | TM Mode |
| 100 nm | 2.51-8.31e-4i | 2.13-1.756e-3i | 99% | 100% |
| 200 nm | 2.541-1.236e-4i | 2.026-5.362e-4i | 63.3% | 98.7% |
| 250 nm | 2.545-4.875e-5i | 2.008-3.04e-4i | 32.6% | 91.5% |
| 300 nm | 2.546-1.95e-5i | 2.0-1.72e-4i | 14.6% | 75% |
| 350 nm | 2.547-7.84e-6i | 1.99-9.69e-5i | 6.2% | 54% |
| 400 nm | 2.547-3.1e-6i | 1.99-5.385e-5i | 2.5% | 35.4% |

Figure 11A:
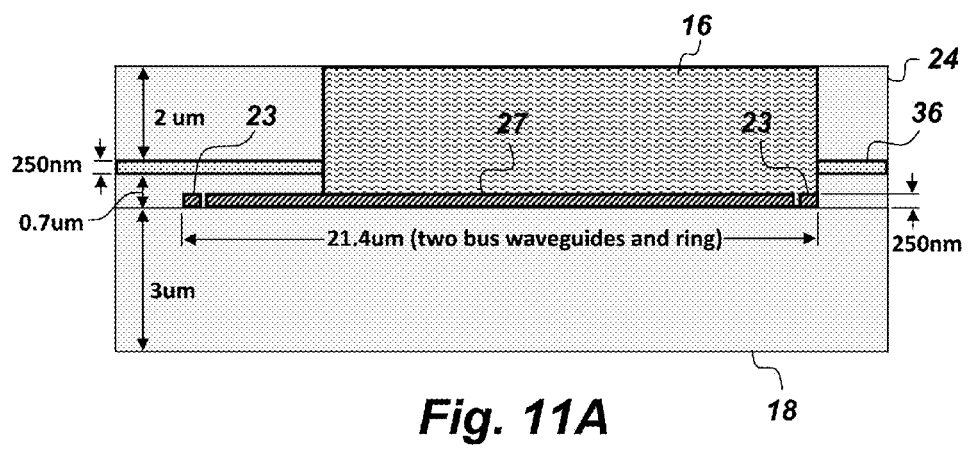
FIG. 11A is a cross-sectional, side view of an embodiment of a photonic circuit.
Figure 11B:
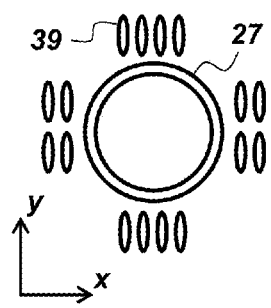
FIGS. 11B-11D are top-view illustrations of a resonator ring surrounded by liquid crystal molecules.
Figure 11C:
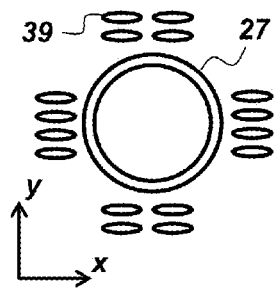
Figure 11D:
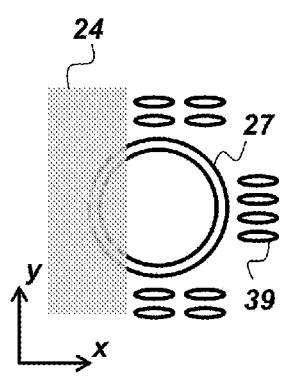

FIG. 11A is a cross-sectional, side view of an embodiment of the photonic circuit 10. FIGS. 11B-11D are illustrations of a resonator ring 27 surrounded by rod-shaped LC molecules 39 of the LC layer 16. In FIGS. 11B and 11C the entire ring 27 is exposed to the LC layer 16. In FIG. 11B the LC molecules' 39 long axis is oriented along the x-direction. In FIG. 11C, the LC tuner 37 has reoriented the LC molecules 39 such that their axes are oriented along the y-direction. The effective index experienced by an optical mode after one trip around the ring 27 is the same in both cases (i.e. in both FIGS. 11B and 11C), even though the liquid crystal molecules 39 have completely changed their orientation. In FIG. 11D, part of the $SiO_2$ cladding 24 breaks the symmetry of the ring 27 and allows for the optical mode to sense the different LC molecule orientations.

Figure 12:
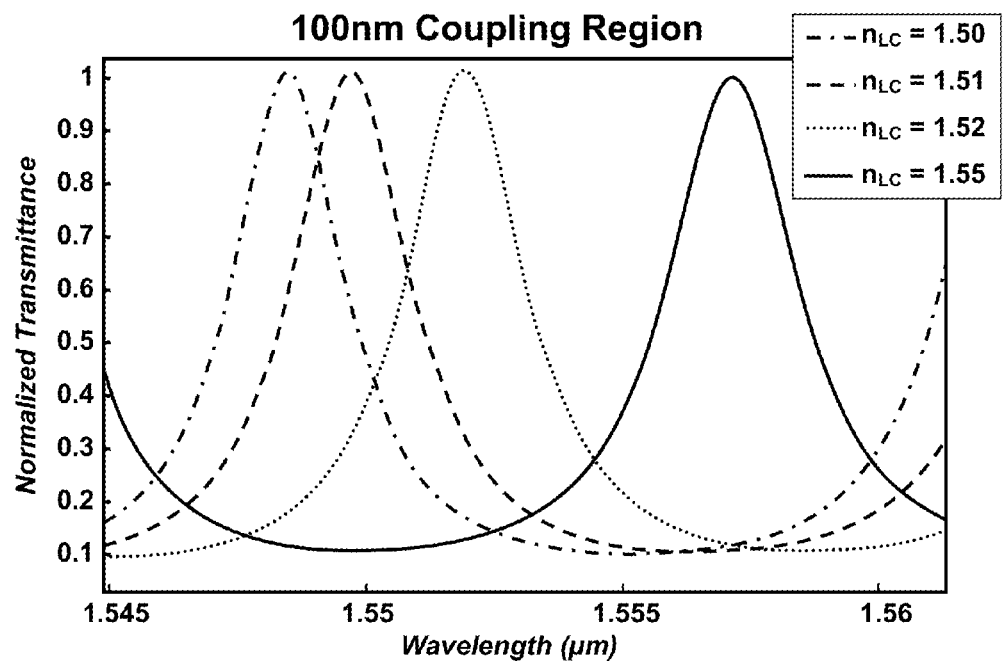
FIG. 12 is a plot of the normalized transmittance versus wavelength for a ring resonator photonic device.
Figure 12:
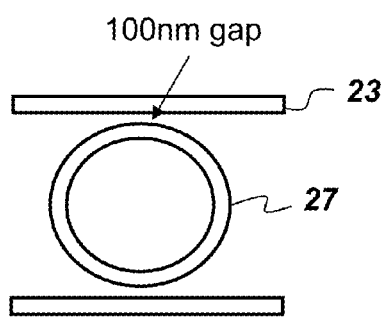

FIG. 12 is a plot of the normalized transmittance versus wavelength for a ring resonator photonic device with a 100 nm gap 15 between the bus waveguide 23 and the ring 27. In other words, the bus waveguide 23 is spaced 100 nm from the ring 27, resulting in a 3 nm wide spectral filter. A change in the applied field produces a change in the refractive index of the LC cladding 16, effectively changing the location at which a resonance occurs. Tuning of the LC cladding 16 may be used to compensate for changes in the refractive index of silicon due to temperature variations.

Figure 13:
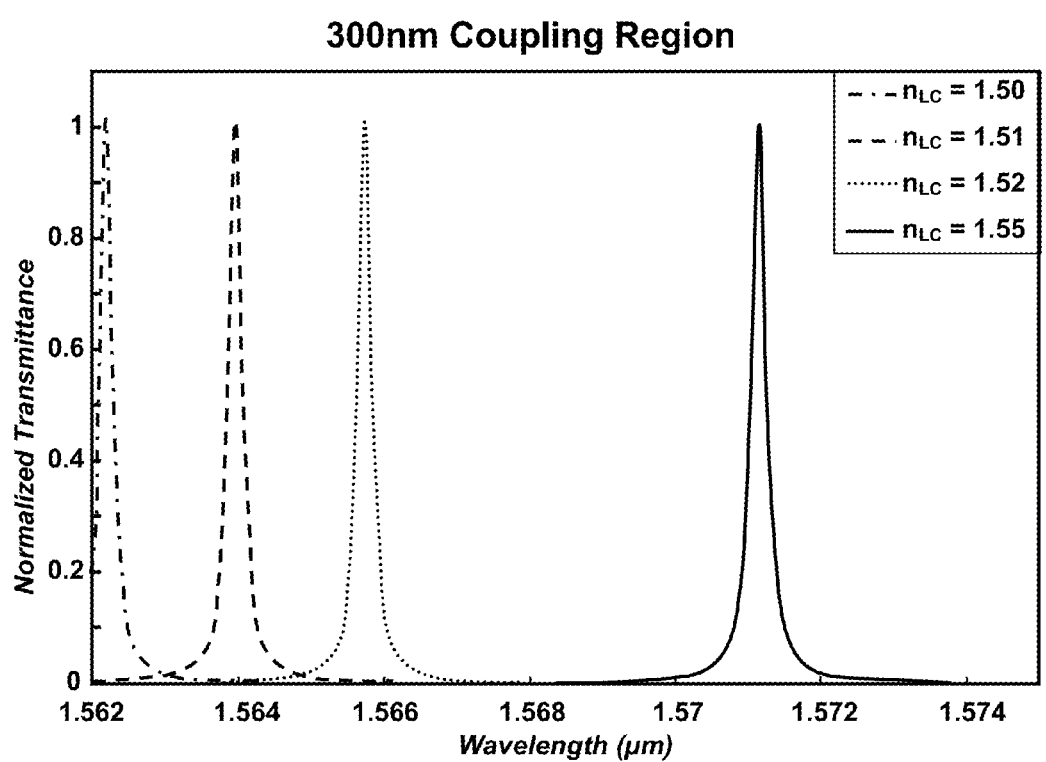
FIG. 13 is a plot of the normalized transmittance versus wavelength for a ring resonator photonic device.

FIG. 13 is a plot of the normalized transmittance versus wavelength for a ring resonator photonic device with a 300 nm gap 15 between the bus waveguide 23 and the ring 27. Placing the bus waveguide 23 farther away from the ring 27 results in a narrower filter. In this embodiment, the bus waveguide 23 is spaced 300 nm from the ring 27, resulting in a FWHM of 220 pm, or, in other words, a 220 pm-wide spectral filter.

Figure 14:
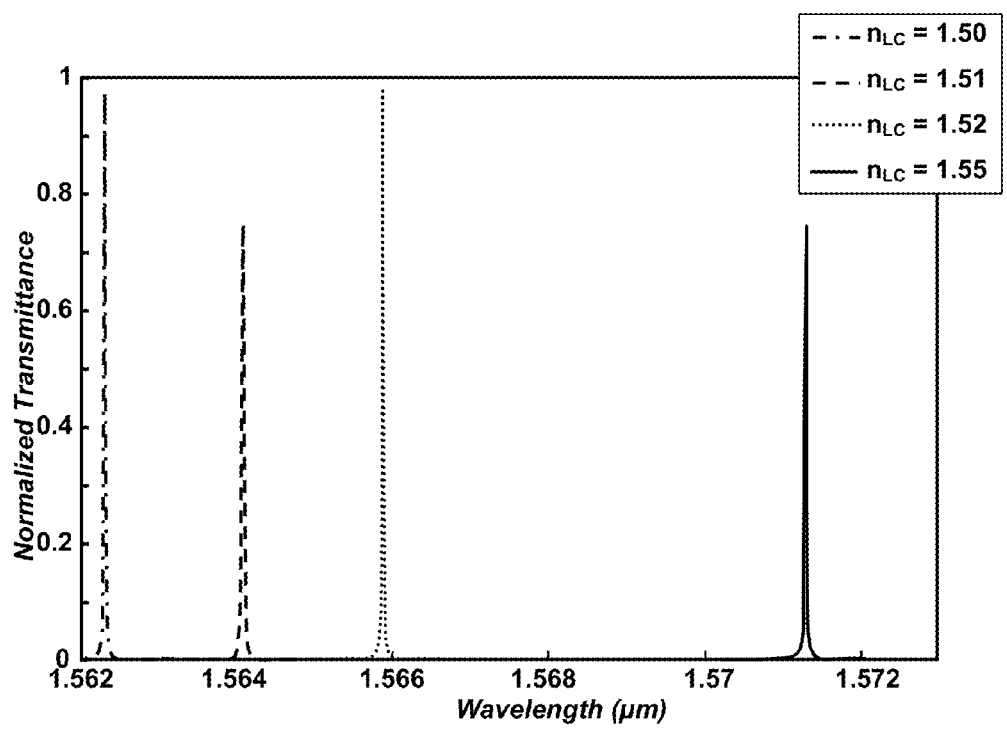
FIG. 14 is a plot of the normalized transmittance versus wavelength for a ring resonator photonic device.

FIG. 14 is a plot of the normalized transmittance versus wavelength for a ring resonator photonic device with a 500 nm gap 15 between the bus waveguide 23 and the ring 27. In this embodiment, the bus waveguide 23 is spaced 500 nm from the ring 27, resulting in a FWHM of 15 pm, or, in other words, a 15 pm-wide spectral filter.

In embodiments of the photonic circuit 10 where the LC layer 16 is actively tuned, the photonic circuit 10 may further comprise a temperature sensor configured to monitor the temperature of the photonic 14. Based on feedback form the temperature sensor, the LC tuner may be configured to tune the LC layer 16 to actively stabilize the temperature of the photonic device 14. The LC tuner may be any device capable of adjusting the refractive index of the LC layer 16. In one example embodiment, the LC tuner may comprise electrodes configured to subject the LC layer 16 to an electric field. The photonic circuit 10 is not limited to a single photonic device 14, but may comprise a plurality of photonic devices 14. Each device 14 would have its own temperature profile. A separate window area 26 may correspond to each device 14 such that each device 14 is exposed to a separate LC layer 16. Alternatively, at least two of the devices 14 may be clad in the same LC layer 16. Separate sections of the LC layer 16 may be selectively tuned such that the temperature across the circuit 10 is stabilized.

Figure 15:
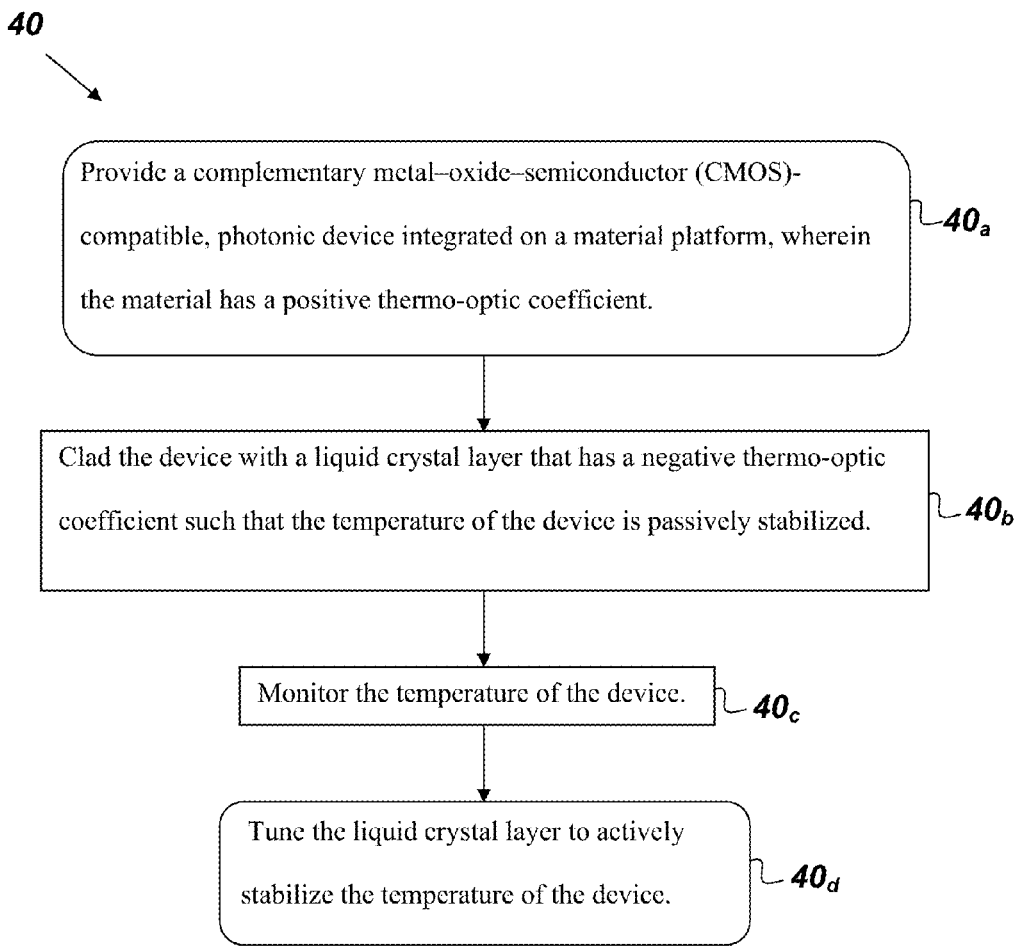
FIG. 15 is a flowchart of a method for stabilizing the temperature of a photonic circuit.

FIG. 15 is a flowchart of a method 40 for stabilizing the temperature of a photonic circuit. The first step $40_a$ provides for providing a CMOS-compatible, photonic device 14 integrated on a material platform 12, wherein the material 12 has a positive TOC. The next step $40_b$ provides for cladding the device 14 with the LC layer 16 that has a negative thermo-optic coefficient such that the temperature of the device is passively stabilized. The next step $40_c$ provides for monitoring the temperature of the device 14. The next step $40_d$ provides for tuning the LC layer 16 to actively stabilize the temperature of the device 14.

Figure 16:
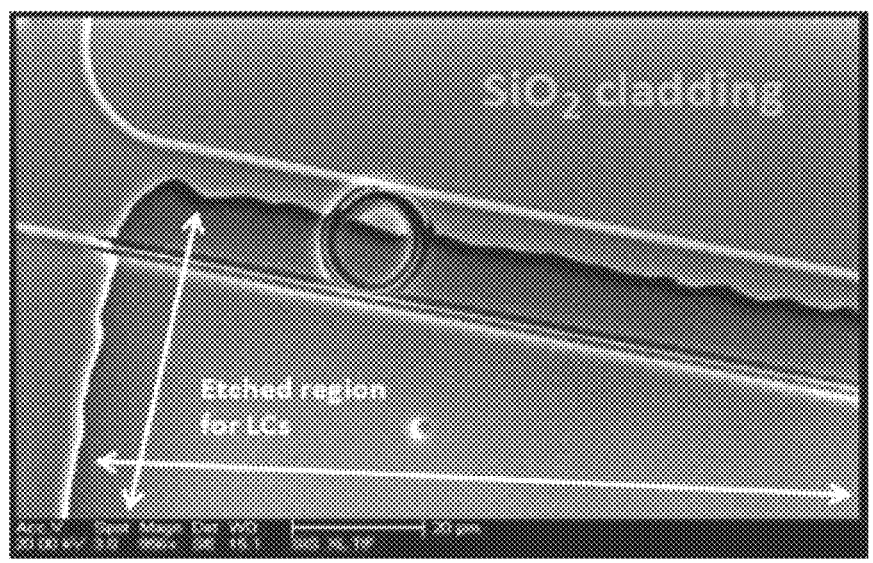
FIG. 16 is a scanning electron microscope image of a photonic device.

FIG. 16 is an SEM image of an embodiment of the photonic circuit 10, that is configured such that the LC layer 16 may be actively tuned optically. In this embodiment, the photonic device 14 is a silicon ring resonator. The LC layer 16 comprises rod-shaped organic molecules, the orientation of which can be altered by photo-manipulation. In the presence of small amounts (~1%) of light-absorbing Azo dyes, such as methyl red (MR), the reorientation effect may be amplified for a number of reasons. In this embodiment, the main mechanism at work is attributed to the intra-molecular torque exerted by the laser-excited Azo dye molecules on the LC director axis, resulting in reorientation of the LC director axis orthogonal to the light polarization direction.

Typical metrics for silicon photonic ring resonators include the center frequency, free spectral range (FSR), and the Q factor. The resonance width and FSR can be further used to calculate the finesse, which relates the internal and external losses of the resonator. LC properties pertinent to the photonic circuit 10 include birefringence, AC and optical dielectric anisotropies, and clearing temperature. The photonic device 14 shown in FIG. 16 was clad in the LC mixture 5CB. 2D finite-element simulations may be implemented in COMSOL Multiphysics® to study the tuning of such 5CB cladded structures. The effective index method may be used in defining the effective mode indices and propagation constants for TE and TM modes of the ring resonator embodiment of the photonic device 14. Since TM modes are less confined to the core region, they are more susceptible to the LC birefringence effects. In practice, however, TE modes are preferred since TE is the ground mode of the waveguide and the strong modal confinement of TE polarized light enables sharp bends, thereby realizing dense photonic integrated circuits on a single silicon chip. Coupling to the ring resonator embodiment of the photonic device 14 may be achieved by placing the bus waveguide 23 adjacent to the ring 27 at a distance, allowing for evanescent mode overlap. A resonance occurs when the optical path length of the resonator is exactly a whole number of wavelengths and the spacing between the resonances is referred to as the FSR. The shift in the resonant wavelength Δλ takes place due to a change of the effective index of the resonant mode $n_{eff}$, given by $$\Delta\lambda = \frac{L}{m}\Delta n_{eff(\lambda_1 - \lambda_2)} \qquad \text{Equation (3)}$$

where m indicates the order of the resonance, L is the circumference of the resonator, λ is the free-space wavelength of the resonant frequency, and $\lambda_1 - \lambda_2$ is the change in the resonant wavelength as a function of changing cladding index. Length of the device ring perimeter plays a role in the observable amount of resonant wavelength shift for a particular $\Delta n_{eff}$.

In the embodiment of the photonic device 14 shown in FIG. 16, the ring resonator consists of two 550 nm wide, 30 μm long waveguides 32 separated by 100 nm from a centrally situated 19.8 μm diameter ring 27 (also 550 nm wide). Tuning of the ring resonator depends on how far the mode extends into the cladding regions, the amount of space in the coupling region between the ring 27 and waveguides 23, and the accrued losses (including coupling to bus waveguides 23), as well as the initial alignment of molecules in the LC layer 16. The silicon dioxide cladding region 24 expands to cover a third of the ring 27 in order to break the ring symmetry, as otherwise the effective index changes stemming from the contributions of the two linear polarizations may cancel each other, resulting in a null shift of the resonance. The model showed that at room temperature, the ring resonator would sustain a resonance shift of 17.1 nm for TE modes in the case of maximum LC refractive index change of Δn=0.1584, and a 5.7 nm shift when Δn=0.06, as depicted in FIG. 17.

Figure 17:
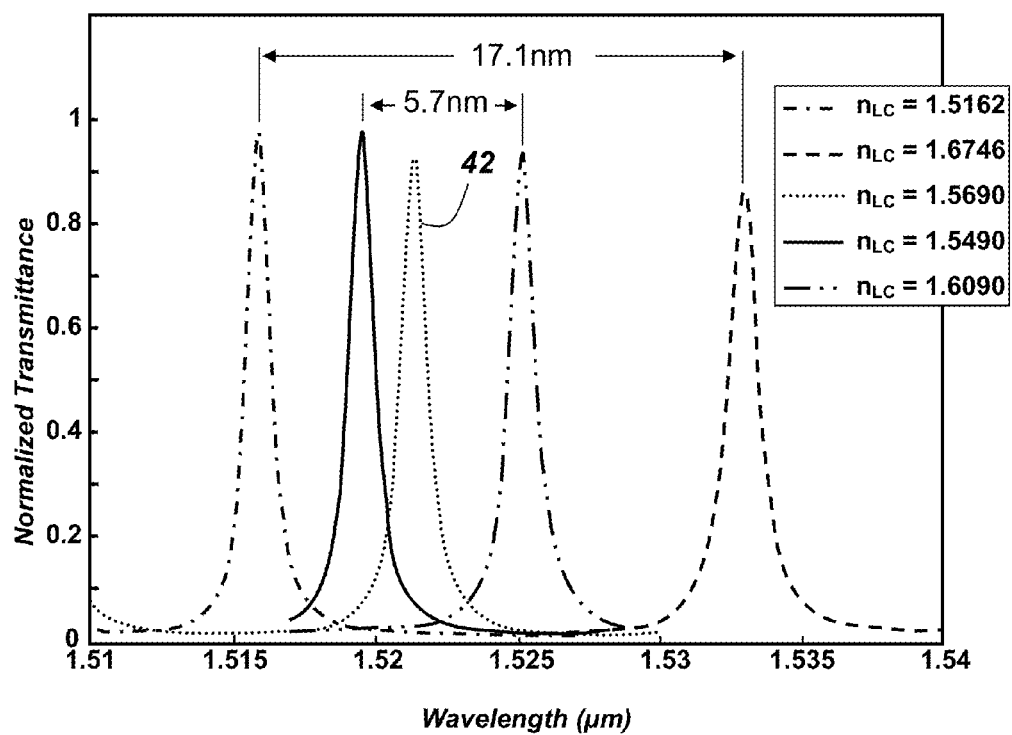
FIG. 17 is a plot of the normalized transmittance versus wavelength for a ring resonator photonic device.

FIG. 17 is a simulation result for TE modes for a ring resonator structure such as is shown in FIG. 16 showing how tuning of the resonance peak is a function of changing 5CB LC cladding index. The dotted line 42 represents the resonance peak corresponding to $n_i$. The maximum shift in the resonance peak was 17.1 nm, while a Δn=0.06 resulted in a resonance shift of Δλ=5.7 nm.

In practice, the photonic circuit 10 depicted in FIG. 16 may be fabricated in a similar manner as described above with respect to FIG. 7. The fabrication process starts with an SOI wafer composed of a 250 nm silicon layer positioned on top of 3 μm $SiO_2$ and with a silicon handle. A 120 nm thick coat of hydrogen silsesquioxane (HSQ) resist spun on the wafer and patterned with electron beam lithography may serve as a mask for the dry etch of silicon. The sample may then be exposed via JEOL JBX-5D11 system and dry etched using the Oxford® Plasmalab 100 RIE/ICP. The resulting silicon waveguides may be covered by a 1.8 μm layer of SiO2 cladding deposited via plasma-enhanced chemical vapor deposition. The window area for the LC layer to break the ring symmetry (such as is shown in FIG. 16) may be patterned with S1805 photoresist, exposed in an Hybrid Technology Group (HTG) Mask Aligner, and etched in a buffered oxide solution. The remaining S1805 photoresist may be removed with acetone, resulting in the structures shown in FIG. 16. Linear inverse tapers may be implemented in the bus waveguides to aid in low loss coupling from an optical fiber to the on-chip waveguides. These adiabatically widened tapers work by increasing the mode size of the waveguide to that of the fiber.

Figure 18A:
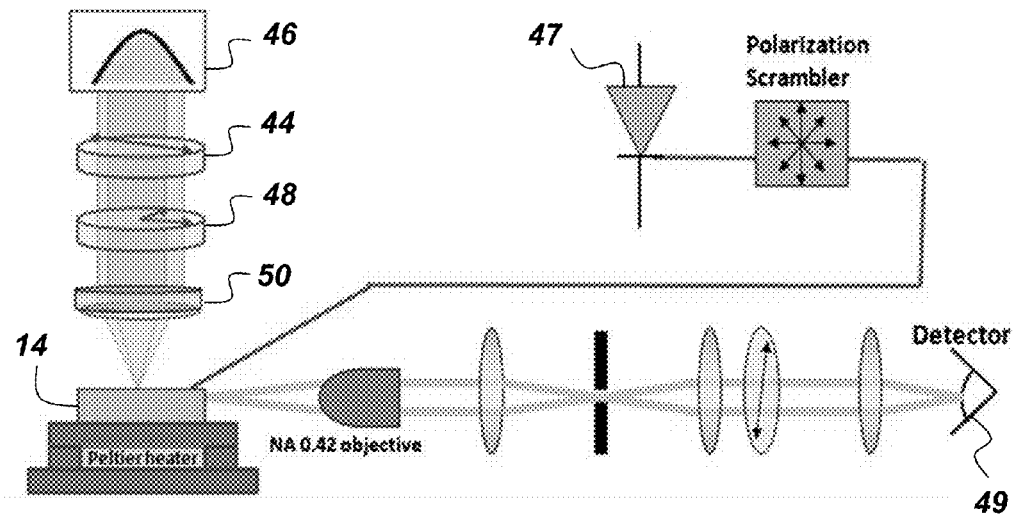
FIG. 18A is an illustration of an embodiment of a photonic circuit.

FIG. 18A is an illustration showing an example, experimental embodiment of the photonic circuit 10 configured for optical tuning of the LC layer 16. A polarizer 44 was positioned in an output path of a light source 46. The light source 46 may be any source of light that is capable of producing an optical beam that may be coupled into a photonic circuit. The light source used in the experiment described herein was a 470 nm Mightex LED light source. The polarizer 44 in the output path of the light source 46 allowed for a selection of TE transmission (horizontal polarization) or TM transmission (vertical polarization). Control of the telecom source 47, the power meter 49, and the source step size was automated. The telecom source 47 used in this experiment was an Agilent 81980A at 1470-1570 nm. The output from the polarizer 44 was received by a quarter wave plate 48, the output of which was focused onto the photonic device 14 with a planoconvex lens 50. The wavelength of the source 46 was chosen to coincide with the MR dye absorption spectrum. The quarter wave plate 48 in conjunction with the polarizer 44 allowed for linear or circular polarization of the light source 46. The output power irradiating the photonic device 14 was 85 μW with a spot size of 0.49 cm2. It should be noted that the LC realignment depends on the UV source dosage (the dosage used in this embodiment was 0.2082 J/cm2) and not on the intensity alone.

Figure 18B:
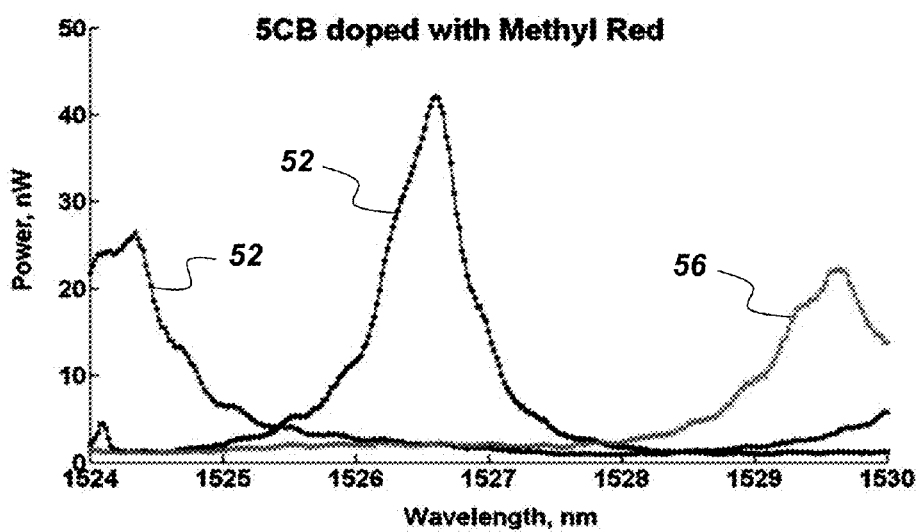
FIG. 18B is a plot of the power versus wavelength for a ring resonator photonic circuit with different liquid crystal cladding orientations.

FIG. 18B is a graph of experimental results of the experimental set-up described above and depicted in FIG. 18A, in which the LC layer 16 was comprised of nematic 5CB LC doped with MR dye. Line trace 52 corresponds to the measured power when the LC molecules were oriented isotropically with respect to the waveguide edge. The line trace 54 corresponds to the measured power when the LC molecules were oriented parallel to the waveguide edge. The line trace 56 corresponds to the measured power when the LC molecules were oriented perpendicular to the waveguide edge. The nematic 5CB LCs were mixed with MR dye at a 1% concentration of MR. A higher MR concentration provides for a larger effect and lower tuning optical power, but it also results in larger losses. A drop of LC material was placed onto the window areas 26 of the photonic circuit 10 and heated at 40° C. (above isotropic temperature of 5CB) for 10 min in order for the LC material to completely fill the cell, then cooled back to room temperature and held at 24° C. Next, the light source 46 was turned on; the quarter wave plate 48 and linear polarizer 44 were set to result in circular polarization, and then set to result in linear polarizations. Corresponding measurements were made. It should be noted that the use of circular polarization at the beginning of the experiment causes the LC to be randomly oriented in addition to accounting for the average absorption that causes heating of the structure and a resulting resonance shift due to thermo-optic effects; in this sense, the measurement with circular polarization serves as a reference, while the linear polarizations then enable one to isolate LC reorientation from heating. The preliminary experimental results, appearing in FIG. 18B, yield a 5.6 nm resonance shift; the location of the resonance was calculated using center of mass, which provides for higher accuracy as compared to tracking the peak value. This resonance shift agrees with the simulated result corresponding to $\Delta n=0.06$. The effective LC index change is usually much smaller than the maximum, since LC molecules strongly anchored at the waveguide-cladding interface do not reorient from their initial alignment. Also note that the resonance peak in the measured result does not coincide with the simulated resonance peak. This difference arises due to fabrication errors in electron beam writing, pattern transfer, reactive ion etching, and wet etching steps, as well as some randomness in the initial LC surface alignment. The measured Q factor of the resonator shown in FIG. 16 was calculated as 2544, and our measured FSR=8.5 nm, resulting in a finesse of 14.2. The Q factor and finesse of this embodiment of the photonic circuit 10 can further be improved by tuning the perimeter of the resonator and by increasing the distance between the bus waveguide and the ring, thus resulting in a smaller full width at half-maximum of the resonance. It can be further improved by other choices of dye dopants or LCs, surface alignment and anchoring conditions, and other waveguide/resonator parameters.

From the above description of the photonic circuit 10, it is manifest that various techniques may be used for stabilizing the temperature of photonic circuit 10 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that photonic circuit 10 is not limited to the particular embodiments described herein, but is capable of many embodiments without departing from the scope of the claims.

We claim:
1. A temperature-stabilized photonic circuit comprising:
    a material platform;
    a complementary metal-oxide-semiconductor (CMOS)-compatible, photonic device integrated on the material platform, wherein the photonic device has a positive thermo-optic coefficient; and
    a liquid crystal layer clad over the photonic device, wherein the liquid crystal layer has a negative thermo-optic coefficient such that the temperature of the circuit is passively stabilized through adjustment of the effective refractive index of the photonic device.
2. The apparatus of claim 1, wherein the material platform is silicon.
3. The apparatus of claim 1, further comprising:
    a temperature sensor configured to monitor the temperature of the device;
    a liquid crystal tuner operatively coupled to the liquid crystal layer, wherein the liquid crystal tuner is configured to tune the liquid crystal layer to actively stabilize the temperature of the device.
4. The apparatus of claim 3, wherein the circuit further comprises:
    a plurality of devices disposed on the material platform, wherein each device has its own temperature profile, and wherein each device is clad by a corresponding section of the liquid crystal layer; and wherein the temperature sensor is further configured to sense the temperature of each device, and wherein the liquid crystal tuner is further configured to selectively tune the separate sections of the liquid crystal layer such that the temperature across the circuit is stabilized.

5. The apparatus of claim 1, wherein the photonic device is configured to operate without the liquid crystal layer and wherein, apart from temperature stabilization, the liquid crystal layer is designed to not otherwise affect the operation of the photonic device.

6. The apparatus of claim 1, wherein the temperature-stabilized circuit comprises no polymer cladding or thermoelectric coolers.

7. The apparatus of claim 3, wherein the device is selected from the group consisting of: a waveguide, an optical filter, a modulating structure, and an optical coupler.

8. The apparatus of claim 3, wherein the circuit further comprises:
   a plurality of devices disposed on the material platform, wherein each device has its own temperature profile; and
   a plurality of liquid crystal claddings wherein each device is clad by a corresponding liquid crystal cladding; and
   wherein the temperature sensor is further configured to sense the temperature of each device, and wherein the liquid crystal tuner is further configured to selectively tune each liquid crystal cladding in response to feedback from the temperature sensor such that the temperature across the circuit is stabilized.

9. A method for stabilizing the temperature of a circuit comprising the following steps:
   providing a complementary metal-oxide-semiconductor (CMOS)-compatible, photonic device integrated on a material platform, wherein the device has a positive thermo-optic coefficient; and
   cladding the device with a liquid crystal layer that has a negative thermo-optic coefficient such that the temperature of the device is passively stabilized by adjusting the effective refractive index of the photonic device.

10. The method of claim 9, wherein the material is silicon.

11. The method of claim 9, further comprising the steps of monitoring the temperature of the circuit and tuning the liquid crystal layer to actively stabilize the temperature of the circuit.

12. The method of claim 9, wherein the circuit comprises a plurality of devices each having its own temperature profile, and wherein each device corresponds to a separate section of the liquid crystal layer, and further comprising the step of selectively tuning individual sections of the liquid crystal layer such that the temperature across the circuit is stabilized even when the temperature profiles of each of the plurality of devices vary from one to another.

13. The method of claim 9, wherein the photonic device is configured to operate without the liquid crystal layer and wherein, apart from temperature stabilization, the liquid crystal layer is designed to not otherwise affect the operation of the photonic device.

14. The method of claim 9, wherein the temperature of the circuit is passively stabilized without the use of polymer cladding.

15. The method of claim 11, wherein the temperature of the circuit is actively stabilized without the use of thermo electric coolers.

16. The method of claim 11, wherein the liquid crystal layer is tuned with a direct current (DC) voltage.

17. The method of claim 11, wherein the liquid crystal layer is tuned with an alternating current (AC) field.

18. The method of claim 11, wherein the liquid crystal layer is tuned with an external magnetic field.

19. The method of claim 11, wherein the liquid crystal layer is optically tuned.

20. A temperature-stabilized photonic circuit comprising:
   a silicon platform;
   a complementary metal-oxide-semiconductor (CMOS)-compatible, photonic device integrated on the silicon platform, wherein the photonic device has a positive thermo-optic coefficient;
   a tunable liquid crystal layer clad over the photonic device;
   a temperature sensor configured to monitor the temperature of the device; and
   a liquid crystal tuner operatively coupled to the liquid crystal layer, wherein the liquid crystal tuner is configured to tune the refractive index of the liquid crystal layer thereby tuning the effective refractive index of the photonic device such that the temperature of the device is actively stabilized.

* * * * *